(12) United States Patent
Krainiouk et al.

(10) Patent No.: US 11,843,682 B1
(45) Date of Patent: Dec. 12, 2023

(54) PREPOPULATING AN EDGE SERVER CACHE

(71) Applicant: Adobe Inc., San Jose, CA (US)

(72) Inventors: Alexei Krainiouk, Petaluma, CA (US);
Marius Petria, Sector (RO); Ian E Boston, Cambridge (GB); Andreea Miruna Moise, Bucharest (RO)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/900,414

(22) Filed: Aug. 31, 2022

(51) Int. Cl.
*G06F 15/16* (2006.01)
*H04L 67/5682* (2022.01)

(52) U.S. Cl.
CPC ............................. *H04L 67/5682* (2022.05)

(58) Field of Classification Search
CPC .................................................. H04L 67/5682
USPC ........................................................ 709/213
See application file for complete search history.

(56) References Cited

U.S. PATENT DOCUMENTS

| | | | | |
|---|---|---|---|---|
| 6,076,107 A * | 6/2000 | Chen | .................. | H04L 41/0213 709/224 |
| 6,151,630 A * | 11/2000 | Williams | .............. | G06F 16/957 709/227 |
| 6,324,632 B1 * | 11/2001 | McIntosh-Smith | .......................... | G06F 12/0848 74/129 |
| 6,442,651 B2 * | 8/2002 | Crow | .................. | G06F 16/9574 709/213 |
| 6,484,239 B1 * | 11/2002 | Hill | .......................... | G06F 9/383 711/213 |
| 6,542,967 B1 * | 4/2003 | Major | .................. | G06F 16/9574 711/134 |
| 6,954,456 B2 * | 10/2005 | Cranor | ................ | H04L 67/1014 709/219 |
| 6,986,018 B2 * | 1/2006 | O'Rourke | .................. | H04L 9/40 709/227 |
| 7,562,153 B2 * | 7/2009 | Biliris | .................. | H04L 67/1023 709/224 |
| 7,610,357 B1 * | 10/2009 | Chandrachood | ...... | H04L 41/147 709/219 |
| 7,680,897 B1 * | 3/2010 | Carter | ..................... | H04L 47/70 709/219 |
| 7,912,921 B2 * | 3/2011 | O'Rourke | .................. | H04L 9/40 709/219 |
| 7,930,429 B2 * | 4/2011 | Maloo | ................. | H04L 67/1001 709/219 |

(Continued)

FOREIGN PATENT DOCUMENTS

WO  WO-2007079192 A2 * 7/2007 ....... G06F 17/30902
WO  WO-2022034619 A1 * 2/2022

*Primary Examiner* — Alicia Baturay
(74) *Attorney, Agent, or Firm* — FIG. 1 Patents

(57) ABSTRACT

Edge server cache techniques are described to prepopulate an edge server cache. The edge servers are configurable to maintain a first set of digital content that is currently made available via content requests to client devices. The edge servers are also configured to maintain a second set of digital content, separately, that is to be launched. The second set of digital content is not made publicly available until launch, but rather is "pre-warmed" in the caches of the respective edge servers. In an implementation, prelaunch access is provided using respective credentials, e.g., to verify operation of the second set of digital content using software and hardware resources at actual edge servers that implement the caches.

20 Claims, 7 Drawing Sheets

(56) References Cited

U.S. PATENT DOCUMENTS

| | | | | |
|---|---|---|---|---|
| 8,103,780 B2* | 1/2012 | Maloo | H04L 61/4511 | 709/227 |
| 8,156,066 B2* | 4/2012 | Wang | H04L 63/101 | 706/47 |
| 8,199,752 B2* | 6/2012 | Swanson | H04L 67/00 | 370/401 |
| 8,200,958 B2* | 6/2012 | Coppola | H04L 67/568 | 713/153 |
| 8,219,645 B2* | 7/2012 | Harvell | H04L 65/1026 | 709/219 |
| 8,219,647 B2* | 7/2012 | Harvell | H04L 67/568 | 709/219 |
| 8,250,232 B2* | 8/2012 | Gordon | H04L 65/762 | 725/91 |
| 8,250,368 B2* | 8/2012 | Coppola | H04L 67/568 | 713/176 |
| 8,266,246 B1* | 9/2012 | Cho | H04L 65/1089 | 725/35 |
| 8,270,403 B2* | 9/2012 | Swanson | H04L 45/125 | 370/401 |
| 8,291,083 B2* | 10/2012 | Black | H04L 67/52 | 709/224 |
| 8,291,117 B1* | 10/2012 | Eggleston | H04L 69/329 | 709/245 |
| 8,306,022 B1* | 11/2012 | Cranor | H04L 67/1034 | 370/401 |
| 8,321,521 B1* | 11/2012 | Raciborski | H04L 67/1097 | 709/213 |
| 8,346,784 B1* | 1/2013 | Potekhin | H04L 67/561 | 707/751 |
| 8,356,074 B1* | 1/2013 | Ehrlich | H04L 67/1021 | 709/250 |
| 8,370,449 B2* | 2/2013 | Harvell | H04L 67/289 | 709/219 |
| 8,396,970 B2* | 3/2013 | Black | G06F 9/5027 | 709/219 |
| 8,402,160 B2* | 3/2013 | Gordon | H04L 67/61 | 709/233 |
| 8,447,854 B1* | 5/2013 | Jasinskyj | H04L 67/289 | 709/224 |
| 8,458,290 B2* | 6/2013 | Black | G06F 16/27 | 709/217 |
| 8,478,858 B2* | 7/2013 | Dunbar | H04N 21/2181 | 709/201 |
| 8,495,171 B1* | 7/2013 | Potekhin | G06F 16/957 | 709/217 |
| 8,504,775 B2* | 8/2013 | Plamondon | G06F 16/9574 | 711/E12.07 |
| 8,510,417 B2* | 8/2013 | Cadwell | H04L 67/1008 | 709/219 |
| 8,516,082 B2* | 8/2013 | Cadwell | H04L 67/1006 | 709/219 |
| 8,521,813 B2* | 8/2013 | Black | H04L 67/51 | 709/217 |
| 8,527,645 B1* | 9/2013 | Proffit | G06F 9/5027 | 718/103 |
| 8,533,754 B2* | 9/2013 | Cho | H04N 21/84 | 725/38 |
| 8,612,588 B1* | 12/2013 | Ehrlich | G06F 16/9577 | 709/224 |
| 8,612,622 B2* | 12/2013 | Swanson | H04L 45/125 | 709/201 |
| 8,615,577 B2* | 12/2013 | Black | H04L 67/564 | 709/201 |
| 8,621,042 B2* | 12/2013 | Eggleston | H04L 61/4511 | 370/254 |
| 8,626,876 B1* | 1/2014 | Kokal | H04N 21/2181 | 709/219 |
| 8,644,674 B2* | 2/2014 | Anderson | H04N 21/26258 | 725/32 |
| 8,660,115 B2* | 2/2014 | Cranor | H04L 67/1019 | 370/401 |
| 8,683,002 B2* | 3/2014 | Harvell | G06F 16/9574 | 709/219 |
| 8,701,010 B2* | 4/2014 | Plamondon | H04L 67/10 | 709/219 |
| 8,707,039 B2* | 4/2014 | Coppola | G06F 21/6218 | 713/168 |
| 8,745,484 B2* | 6/2014 | Roberts | G06F 16/9577 | 715/205 |
| 8,769,047 B1* | 7/2014 | Coppola | H04L 67/568 | 709/218 |
| 8,782,279 B2* | 7/2014 | Eggleston | H04L 61/5007 | 709/245 |
| 8,819,187 B1* | 8/2014 | Hofmann | H04L 69/14 | 709/219 |
| 8,825,830 B2* | 9/2014 | Newton | H04L 65/403 | 709/223 |
| 8,832,247 B2* | 9/2014 | King | G06F 12/0813 | 711/129 |
| 8,856,329 B2* | 10/2014 | Black | G06F 16/13 | 709/225 |
| 8,868,760 B2* | 10/2014 | Maloo | H04L 61/4511 | 709/227 |
| 8,886,742 B2* | 11/2014 | Crowe | H04L 67/5681 | 709/216 |
| 8,886,769 B2* | 11/2014 | Thibeault | H04L 65/612 | 709/219 |
| 8,892,686 B1* | 11/2014 | Thibeault | H04L 67/5651 | 709/219 |
| 8,965,997 B2* | 2/2015 | Harvell | H04L 67/568 | 709/219 |
| 8,966,003 B2* | 2/2015 | Kokal | H04N 21/47202 | 709/217 |
| 8,984,056 B2* | 3/2015 | Ehrlich | H04L 67/61 | 709/213 |
| 9,009,272 B2* | 4/2015 | Kokal | H04L 67/06 | 709/219 |
| 9,015,348 B2* | 4/2015 | Hofmann | H04L 41/50 | 709/246 |
| 9,058,402 B2* | 6/2015 | Ehrlich | G06F 16/9574 | |
| 9,094,464 B1* | 7/2015 | Scharber | H04L 67/568 | |
| 9,112,921 B2* | 8/2015 | Heller | H04L 65/60 | |
| 9,154,551 B1* | 10/2015 | Watson | H04L 67/5681 | |
| 9,161,080 B2* | 10/2015 | Crowe | H04N 21/2181 | |
| 9,197,537 B2* | 11/2015 | Swanson | H04L 45/125 | |
| 9,223,709 B1* | 12/2015 | O'Bleness | G06F 12/0864 | |
| 9,286,310 B1* | 3/2016 | Emelyanov | G06F 16/172 | |
| 9,350,821 B2* | 5/2016 | Hofmann | H04L 67/568 | |
| 9,372,803 B2* | 6/2016 | Manne | G06F 12/0891 | |
| 9,509,804 B2* | 11/2016 | Stevens | H04L 67/02 | |
| 9,515,980 B2* | 12/2016 | Eggleston | H04L 61/4511 | |
| 9,516,084 B2* | 12/2016 | Phillips | H04L 65/80 | |
| 9,571,407 B2* | 2/2017 | Harvell | H04L 69/16 | |
| 9,621,669 B2* | 4/2017 | Crowe | H04L 67/2885 | |
| 9,628,342 B2* | 4/2017 | Newton | H04L 43/04 | |
| 9,628,343 B2* | 4/2017 | Newton | H04L 41/0816 | |
| 9,628,344 B2* | 4/2017 | Newton | H04L 61/10 | |
| 9,628,345 B2* | 4/2017 | Newton | H04L 41/0823 | |
| 9,628,346 B2* | 4/2017 | Crowder | H04L 69/03 | |
| 9,628,347 B2* | 4/2017 | Varney | H04L 41/12 | |
| 9,633,217 B2* | 4/2017 | Potekhin | H04L 67/02 | |
| 9,634,904 B2* | 4/2017 | Varney | H04L 47/83 | |
| 9,634,905 B2* | 4/2017 | Newton | H04L 67/01 | |
| 9,634,906 B2* | 4/2017 | Varney | G06F 15/173 | |
| 9,634,907 B2* | 4/2017 | Varney | H04L 41/0869 | |
| 9,634,918 B2* | 4/2017 | Lipstone | H04L 41/50 | |
| 9,641,401 B2* | 5/2017 | Varney | G06F 9/5055 | |
| 9,641,402 B2* | 5/2017 | Newton | H04L 69/03 | |
| 9,647,899 B2* | 5/2017 | Varney | H04L 41/0816 | |
| 9,647,900 B2* | 5/2017 | Crowder | H04L 67/06 | |
| 9,647,901 B2* | 5/2017 | Newton | H04L 47/83 | |
| 9,648,127 B2* | 5/2017 | Newton | H04L 67/5682 | |
| 9,654,353 B2* | 5/2017 | Newton | G06F 15/173 | |
| 9,654,354 B2* | 5/2017 | Newton | H04L 41/0893 | |
| 9,654,355 B2* | 5/2017 | Varney | H04L 47/83 | |
| 9,654,356 B2* | 5/2017 | Varney | G06F 15/173 | |
| 9,654,579 B2* | 5/2017 | Stevens | H04L 67/561 | |
| 9,660,874 B2* | 5/2017 | Lipstone | H04L 43/04 | |

(56) References Cited

U.S. PATENT DOCUMENTS

| | | | |
|---|---|---|---|
| 9,660,875 B2* | 5/2017 | Crowder | H04L 67/2885 |
| 9,660,876 B2* | 5/2017 | Lipstone | H04L 41/0869 |
| 9,660,888 B2* | 5/2017 | Jasinskyj | H04L 67/535 |
| 9,661,046 B2* | 5/2017 | Varney | H04L 67/1078 |
| 9,667,506 B2* | 5/2017 | Varney | G06F 9/5055 |
| 9,667,747 B2* | 5/2017 | Stevens | H04L 67/01 |
| 9,686,148 B2* | 6/2017 | Varney | H04L 65/403 |
| 9,705,754 B2* | 7/2017 | Crowder | H04L 67/10 |
| 9,722,882 B2* | 8/2017 | Varney | H04L 61/10 |
| 9,722,883 B2* | 8/2017 | Varney | H04L 67/10 |
| 9,722,884 B2* | 8/2017 | Newton | G06F 15/173 |
| 9,729,663 B2* | 8/2017 | Wolfe | H04L 67/568 |
| 9,736,271 B2* | 8/2017 | Stevens | H04L 67/10 |
| 9,749,190 B2* | 8/2017 | Newton | H04L 67/60 |
| 9,749,191 B2* | 8/2017 | Varney | H04L 67/1078 |
| 9,749,192 B2* | 8/2017 | Varney | H04L 41/0816 |
| 9,755,914 B2* | 9/2017 | Newton | H04L 69/03 |
| 9,787,551 B2* | 10/2017 | Newton | H04L 41/5041 |
| 9,817,840 B1* | 11/2017 | Emelyanov | G06F 16/172 |
| 9,819,554 B2* | 11/2017 | Varney | H04L 65/60 |
| 9,847,917 B2* | 12/2017 | Varney | H04L 67/289 |
| 9,858,187 B2* | 1/2018 | Sundaravaradan | G06F 12/0815 |
| 9,871,881 B2* | 1/2018 | Crowe | H04L 67/2885 |
| 9,887,885 B2* | 2/2018 | Varney | H04L 41/50 |
| 9,942,363 B2* | 4/2018 | Stevens | H04L 63/08 |
| 9,984,002 B2* | 5/2018 | Sundaravaradan | G06F 12/084 |
| 10,009,247 B2* | 6/2018 | Sun | H04N 21/64723 |
| 10,013,501 B2* | 7/2018 | Sundaravaradan | G06F 16/9574 |
| 10,063,653 B2* | 8/2018 | Balakrishnan | H04L 67/306 |
| 10,110,592 B2* | 10/2018 | Veladanda | H04L 63/0823 |
| 10,116,565 B2* | 10/2018 | Hofmann | H04L 47/12 |
| 10,120,872 B2* | 11/2018 | Choubey | H04L 67/5682 |
| 10,135,697 B2* | 11/2018 | Varney | H04L 41/5041 |
| 10,142,191 B2* | 11/2018 | Varney | H04L 67/1078 |
| 10,182,098 B2* | 1/2019 | Natarajan | H04L 65/80 |
| 10,185,666 B2* | 1/2019 | van Greunen | G06F 12/0873 |
| 10,217,152 B2* | 2/2019 | Ku | G06Q 50/01 |
| 10,225,362 B2* | 3/2019 | Watson | H04L 67/5681 |
| 10,237,363 B2* | 3/2019 | Stevens | H04L 67/56 |
| 10,237,374 B2* | 3/2019 | Stevens | H04L 41/509 |
| 10,249,007 B2* | 4/2019 | Murarka | G06F 16/958 |
| 10,257,318 B2* | 4/2019 | Stevens | H04L 41/5051 |
| 10,353,822 B2* | 7/2019 | Busayarat | G06F 12/0891 |
| 10,356,201 B2* | 7/2019 | Crowe | H04L 67/2885 |
| 10,360,154 B2* | 7/2019 | Busayarat | G06F 12/0891 |
| 10,375,154 B2* | 8/2019 | Shnitko | H04L 67/568 |
| 10,375,196 B2* | 8/2019 | Miranda-Steiner | H04N 21/234309 |
| 10,432,708 B2* | 10/2019 | Sherf | H04N 21/00 |
| 10,511,530 B2* | 12/2019 | Foxworthy | H04L 45/021 |
| 10,530,900 B2* | 1/2020 | Stevens | H04L 67/01 |
| 10,574,444 B2* | 2/2020 | Khristi | H04L 9/0827 |
| 10,592,578 B1* | 3/2020 | Mokashi | H04N 21/25 |
| 10,601,946 B2* | 3/2020 | Arsenault | H04L 65/612 |
| 10,608,894 B2* | 3/2020 | Newton | H04L 67/51 |
| 10,652,087 B2* | 5/2020 | Varney | H04L 65/612 |
| 10,681,394 B2* | 6/2020 | Field | H04N 21/2221 |
| 10,686,705 B2* | 6/2020 | Hofmann | H04L 47/12 |
| 10,693,947 B2* | 6/2020 | Shnitko | H04L 67/568 |
| 10,700,945 B2* | 6/2020 | Varney | H04L 41/0823 |
| 10,701,148 B2* | 6/2020 | Varney | H04L 41/0803 |
| 10,701,149 B2* | 6/2020 | Varney | H04L 67/1097 |
| 10,701,454 B2* | 6/2020 | Song | G06F 16/51 |
| 10,708,145 B2* | 7/2020 | Lipstone | H04L 41/5041 |
| 10,742,521 B2* | 8/2020 | Varney | H04L 41/509 |
| 10,771,583 B2* | 9/2020 | Balakrishnan | H04L 67/5682 |
| 10,771,590 B2* | 9/2020 | Tomkins | H04L 67/1097 |
| 10,779,015 B2* | 9/2020 | Knecht | H04N 21/2393 |
| 10,791,050 B2* | 9/2020 | Varney | H04L 41/509 |
| 10,810,279 B2* | 10/2020 | Goel | H04L 67/02 |
| 10,826,793 B2* | 11/2020 | Varney | H04L 41/12 |
| 10,841,177 B2* | 11/2020 | Lipstone | H04L 41/50 |
| 10,841,353 B2* | 11/2020 | Phillips | H04N 21/26258 |
| 10,862,769 B2* | 12/2020 | Lipstone | H04L 67/5682 |
| 10,862,939 B2* | 12/2020 | Upadhyaya | H04L 65/80 |
| 10,862,965 B2* | 12/2020 | Falco | H04L 67/55 |
| 10,893,118 B2* | 1/2021 | Crowe | H04L 67/5681 |
| 10,917,165 B2* | 2/2021 | Takagi | H04W 8/082 |
| 10,931,541 B2* | 2/2021 | Lipstone | H04L 67/55 |
| 10,992,547 B2* | 4/2021 | Varney | H04L 67/5682 |
| 11,018,951 B2* | 5/2021 | Casey | H04L 41/14 |
| 11,025,740 B2* | 6/2021 | Arsenault | H04L 67/02 |
| 11,055,744 B2* | 7/2021 | Conrad | G06Q 30/0267 |
| 11,063,750 B2* | 7/2021 | Khristi | H04L 9/0825 |
| 11,070,850 B2* | 7/2021 | Field | H04N 21/231 |
| 11,075,987 B1* | 7/2021 | Solapurkar | H04L 67/1023 |
| 11,089,124 B2* | 8/2021 | Sathyanarayana | H04L 67/568 |
| 11,095,743 B2* | 8/2021 | Yellin | G06F 16/9574 |
| 11,106,593 B2* | 8/2021 | Busayarat | G06F 12/0891 |
| 11,121,936 B2* | 9/2021 | Lipstone | H04L 65/60 |
| 11,170,065 B2* | 11/2021 | Tank | G06F 16/9577 |
| 11,204,877 B2* | 12/2021 | Vajravel | G06F 3/0649 |
| 11,212,225 B2* | 12/2021 | Foxworthy | H04L 45/745 |
| 11,233,768 B1* | 1/2022 | Flack | H04L 61/4511 |
| 11,240,337 B2* | 2/2022 | Miranda-Steiner | G06T 5/10 |
| 11,303,717 B2* | 4/2022 | Watson | H04L 67/1014 |
| 11,343,348 B1* | 5/2022 | Stevens | H04L 67/568 |
| 11,356,529 B2* | 6/2022 | Arsenault | H04L 65/612 |
| 11,363,116 B2* | 6/2022 | Tomkins | H04L 67/63 |
| 11,368,548 B2* | 6/2022 | Lipstone | H04L 65/80 |
| 11,374,864 B2* | 6/2022 | Hofmann | H04L 47/12 |
| 11,395,016 B2* | 7/2022 | Field | H04N 21/23113 |
| 11,395,209 B2* | 7/2022 | Boliek | H04W 40/246 |
| 11,405,694 B2* | 8/2022 | Song | H04N 21/4858 |
| 11,431,776 B2* | 8/2022 | Upadhyaya | H04L 65/70 |
| 11,483,415 B2* | 10/2022 | Yellin | H04L 67/5681 |
| 11,489,941 B2* | 11/2022 | Yellin | G06F 9/547 |
| 11,509,741 B2* | 11/2022 | Balakrishnan | H04L 67/1097 |
| 11,516,309 B2* | 11/2022 | Yellin | H04L 67/5681 |
| 11,558,928 B2* | 1/2023 | Sharma | H04W 4/029 |
| 11,570,502 B2* | 1/2023 | El Essaili | H04N 21/2404 |
| 11,604,667 B2* | 3/2023 | Mercier | H04L 67/10 |
| 11,632,437 B2* | 4/2023 | Miranda-Steiner | G06T 5/008 709/205 |
| 11,641,337 B2* | 5/2023 | Flack | H04L 67/10 709/223 |
| 11,656,995 B2* | 5/2023 | Bavishi | G06F 12/0875 711/118 |
| 11,734,751 B2* | 8/2023 | Devoy, III | G06Q 50/01 705/27.2 |
| 11,800,163 B2* | 10/2023 | Wei | H04N 21/258 709/217 |
| 2001/0047456 A1* | 11/2001 | Schrobenhausenhomas | H04N 19/61 711/122 |
| 2008/0177994 A1* | 7/2008 | Mayer | G06F 16/00 709/224 |
| 2010/0235329 A1* | 9/2010 | Koren | H04W 4/50 707/687 |
| 2010/0235473 A1* | 9/2010 | Koren | H04W 4/50 709/219 |
| 2010/0318894 A1* | 12/2010 | Billharz | G06F 40/166 715/255 |
| 2013/0086323 A1* | 4/2013 | Kadlabalu | G06F 16/9574 711/119 |
| 2015/0088655 A1* | 3/2015 | Taylor | G06Q 30/0264 705/14.61 |
| 2015/0127438 A1* | 5/2015 | Wedderburn | G06Q 30/0214 705/14.16 |
| 2017/0019495 A1* | 1/2017 | Bennis | H04L 67/1051 |
| 2018/0359335 A1* | 12/2018 | Du | H04L 67/5681 |
| 2019/0050883 A1* | 2/2019 | Wedderburn | H04L 67/535 |
| 2019/0116385 A1* | 4/2019 | Rohatgi | G06Q 30/0277 |
| 2021/0201341 A1* | 7/2021 | Wedderburn | G06Q 30/0214 |
| 2021/0263779 A1* | 8/2021 | Haghighat | G06F 21/78 |
| 2022/0101415 A1* | 3/2022 | Devoy, III | G06Q 10/087 |
| 2022/0191567 A1* | 6/2022 | Wei | H04N 21/25841 |
| 2022/0382758 A1* | 12/2022 | Schreter | G06F 16/2282 |
| 2022/0391394 A1* | 12/2022 | Schreter | G06F 12/123 |

* cited by examiner

PREPOPULATING AN EDGE SERVER CACHE

BACKGROUND

Content delivery networks (CDNs) have been developed to increase efficiency in delivery and access to a variety of digital content via a network, e.g., webpages, digital images, digital media, digital documents, execution of digital services, digital streaming, and so forth. To do so, content delivery networks employ at least one origin server and a plurality of edge servers to deploy digital content received from the origin server.

The edge servers are implemented to increase data availability through arrangement closer to an "edge" of network to respective client devices that request access to the digital content. In this way, content delivery networks utilize the edge servers to reduce latency and operational costs, e.g., by being placed geographically and architecturally closer to subsets of a population of client devices that request access to the digital content. However, conventional techniques used to launch digital content using these networks are inefficient and hinder operation of these devices as a result of this distributed architecture.

SUMMARY

Edge server cache techniques are described to prepopulate an edge server cache. The edge servers, for instance, are configurable to maintain a first set of digital content that is currently made available via content requests to client devices. The edge servers are also configured to maintain a second set of digital content, separately, that is to be launched. The second set of digital content is not made publicly available until launch, but rather is "pre-warmed" in the caches of the respective edge servers. In an implementation, prelaunch access is provided using respective credentials, e.g., to verify operation of the second set of digital content using software and hardware resources at actual edge servers that implement the caches.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
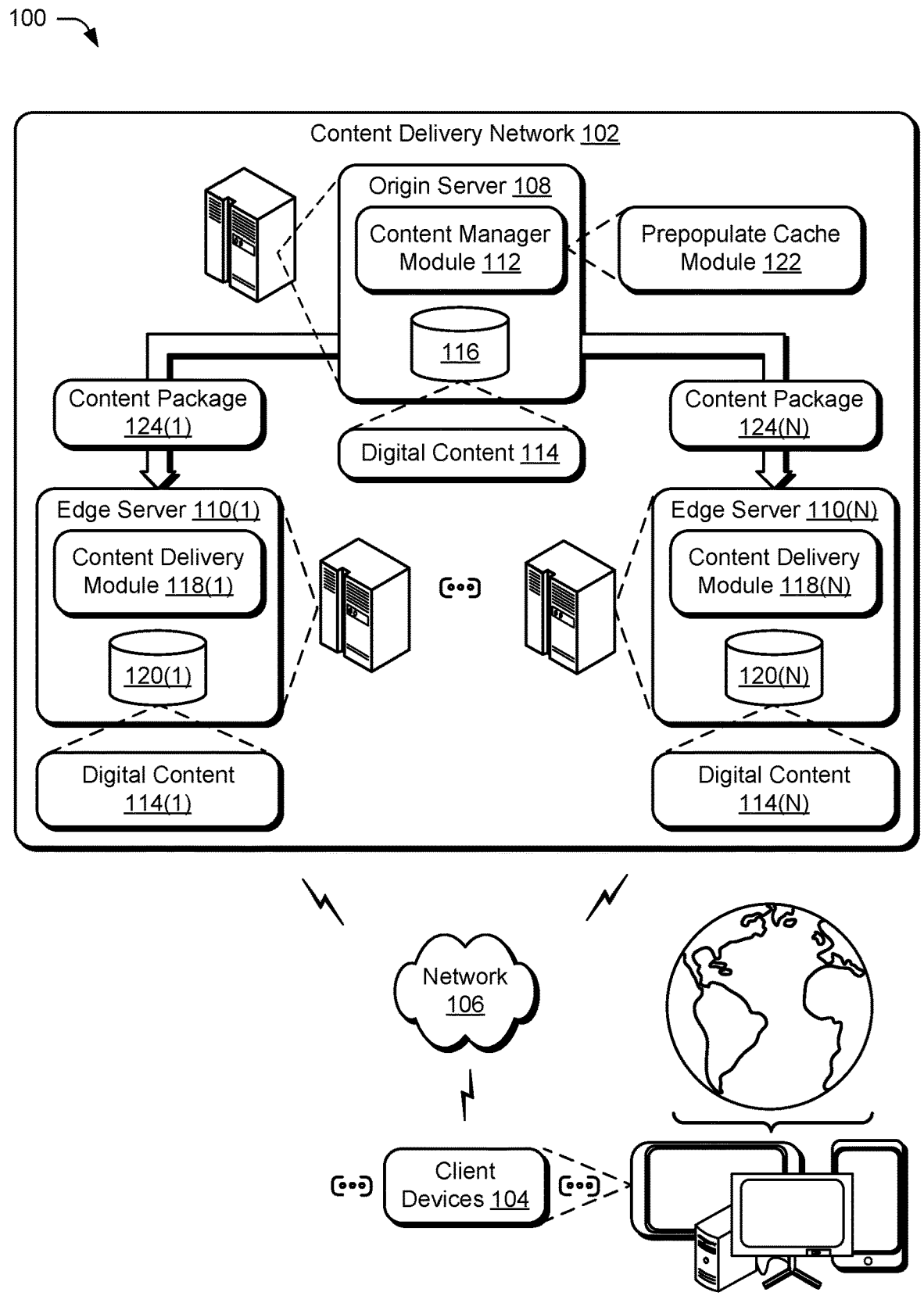
FIG. 1 depicts a system in an example implementation of edge server cache prepopulation.

Content delivery networks (CDNs) employ edge servers to improve performance in client device access to digital content. This is performed, for instance, to improve locality of the digital content with respect to the client devices to reduce lag, distribute computational resource consumption, and so forth. This is usable to provide access to a variety of digital content, examples of which include webpages of a website, digital services, streaming services, and so forth.

In an example of a website, for instance, an origin server originates webpages of the website that are then communicated over a network to the edge servers. The edge servers store the webpages in respective caches, which are then provided to respective client devices in response to content requests received from the devices. This is performable in a variety of ways. In one example, an entirety of the webpages of the website are maintained in each of the caches. In another example, the digital content is maintained and managed "on demand" based on content requests received from the client devices, e.g., using a least-recently-used (LRU) technique, based on content request frequency, and so forth. In this way, responses to content requests are distributed across the edge servers.

Although distributed implementation using the edge servers supports numerous technical advantages, these techniques also introduce additional challenges in real-world scenarios. An example of this occurs as part of a digital content launch. Continuing the previous example of a webpage, introduction of a new product that is a subject of a website typically includes numerous changes to webpages of the website. Conventionally, in order to launch the changed webpages, caches of edge servers are flushed. This causes content requests to be routed to the origin server, instead, until the caches at the edge servers are updated, e.g., in response to content requests in an on-demand scenario, repopulating the cache as a whole, and so forth. In some instances, this surge in traffic at the origin server causes the server to crash from this inrush of requests. To address this, conventional techniques are tasked with scaling origin server resources in order to meet this temporary increase in demand, which is inefficient, computationally expensive, and hinders operation in serving content requests.

To address these technical challenges, techniques are described to prepopulate an edge server cache. The edge servers, for instance, are configurable to maintain a first set of digital content that is currently made available via content requests to client devices. The edge servers are also configured to maintain a second set of digital content, separately, that is to be launched from the first set of digital content. The second set of digital content, for instance, includes webpages that are changed, e.g., to reflect a launch of a corresponding product described in the webpages.

The second set of digital content is not made publicly available until launch, but rather is "pre-warmed" in the caches of the respective edge servers. The second set of digital content, for instance, is maintained along with the first set of digital content in separate partitions. In an implementation, prelaunch access is provided using respective credentials, e.g., to verify operation of the second set of digital content using software and hardware resources at actual edge servers that implement the caches. This supports an ability to store this second set of digital content ahead of time before launch such that once an indicated time is reached, this content is made available globally to the client devices by the edge servers, automatically and without user intervention. In this way, the second set of digital content is launched in a manner that is capable of addressing an inrush of content requests in a computationally efficient manner without scaling origin server resources as involved in conventional techniques. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ edge server cache prepopulation techniques described herein. The illustrated environment includes a content delivery network 102 and a plurality of client devices 104 that are communicatively coupled via a network 106. Computing devices that implement these entities are configurable in a variety of ways.

A computing device, for instance, is configurable as a desktop computer, a laptop computer, a mobile device (e.g., assuming a handheld configuration such as a tablet or mobile phone), and so forth. Thus, the computing device ranges from full resource devices with substantial memory and processor resources (e.g., personal computers, game consoles) to a low-resource device with limited memory and/or processing resources (e.g., mobile devices). Additionally, although a single computing device is shown, the computing device is also representative of a plurality of different devices, such as multiple servers utilized by a business to perform operations "over the cloud" as described in FIG. 9.

The content delivery network 102 includes an origin server 108 and a plurality of edge servers 110(1)-110(N). The origin server 108 includes a content manager module 112 that is configured to manage distribution and provision of digital content 114, which is illustrated as stored in a storage device 116. This management includes providing the digital content 114 directly to client devices 104 via the network 106 over a variety of geographic locations as well as employing functionality of the edge servers 110(1)-110(N).

The plurality of edge servers 110(1)-110(N), for instance, include a plurality of content delivery modules 118(1)-118(N), respectively. The content delivery modules 118(1)-118(N) are configured to manage delivery of copies of the digital content (illustrated as digital content 114(1)-114(N)) from respective caches 120(1)-120(N). As previously described, edge servers 110(1)-110(N) are utilized in the content delivery network 102 to reduce latency and optimize delivery of digital content 114(1)-114(N) to respective client devices 104, e.g., through geographic locality, load balancing, and so forth. Edge servers are also known as "edges," "edge nodes," "edge networks" and so forth with the use of "edge" indicative of a portion of the content delivery network 102 that is nearest, architecturally, to a respective client device 104.

Although these techniques improve digital content availability to the client devices 104, these techniques also introduce additional challenges, an example of which involves a launch of "new" digital content. Webpages of a website, for instance, are updated to reflect availability of new products and/or services. Therefore, the "launch" of these webpages is to coincide with a launch of the products, e.g., as part of a public announcement. In these situations, it is common for website traffic to the website to increase exponentially over typical operation due to increased demand caused by this public announcement. However, conventional techniques used to launch new digital content in the content delivery network 102 hinder and delay access, thereby reducing operational efficiency of the content delivery network 102 that can even cause device failure.

In a conventional example, a website typically receives fifty million content requests per hour from client devices to obtain respective webpages. When new digital content is published by an origin server in a conventional technique, however, errors are encountered as the digital content is populated from the origin server to respective edge servers. This is caused, for instance, in conventional techniques by "flushing" caches of the edge servers. This causes content requests that otherwise would be serviced at the edge servers to be routed instead to the origin server. In real world scenarios, this causes a traffic increase of over a thousand times over that typically observed at the origin server. The caches at the edge servers, for instance, are now empty and thus traffic is instead routed to the origin servers. Therefore, the origin server is tasked with scaling up computational resources to address this increased demand. The demand at the origin server then decreases over time as a hit rate at the edge servers improves, i.e., by filling respective caches. Thus, operation of the origin server and edge server is challenged in these scenarios, even to the point of failure of the origin server in instances due to a lack of ability to scale computational resources to meet this demand. From a perspective of the client devices, the website appears broken, has increased lag, and can fail to return a version of correct digital content thereby also diminishing operation of the client devices.

To address these challenges, the content delivery network 102 includes a prepopulate cache module 122. The prepopulate cache module 122 is representative of functionality of the content delivery network 102 to "prewarm" caches 120(1)-120(N) maintained locally at the respective edge servers 110(1)-110(N). In contrast with the previous conventional example, the prepopulate cache module 122 of the origin server 108 is used to configure and communicate content packages 124(1)-124(N) to respective edge servers 110(1)-110(N). The content packages 124(1)-124(N) include digital content that is a subject of an update, e.g., new pages of the website. The digital content is stored separately from digital content 114(1)-114(N) that is currently made available by the respective edge servers 110(1)-110(N). Therefore, when a switch is to be made (e.g., at a particular time corresponding to a launch), respective content delivery modules 118(1)-118(N) automatically launch the new digital content without user intervention to make this digital content available in a synchronized manner responsive to content requests received from respective client devices 104. Additional examples are also contemplated, including use of techniques to control access before the digital content is to be made publicly available, further discussion of which is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Edge Server Prepopulation

Figure 7:
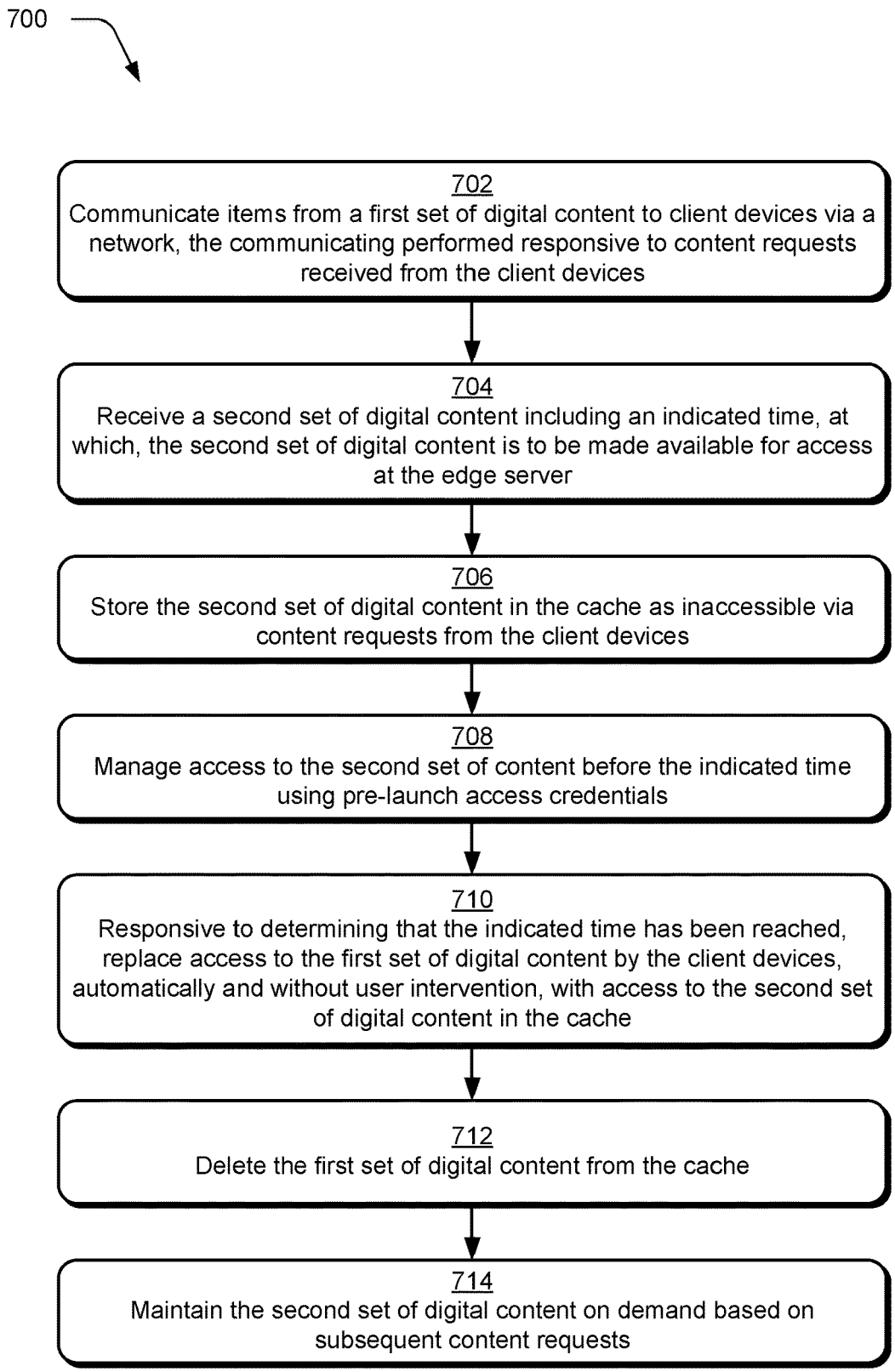
FIG. 7 is a flow diagram depicting a procedure in an example implementation of prepopulating an edge server cache.
Figure 8:
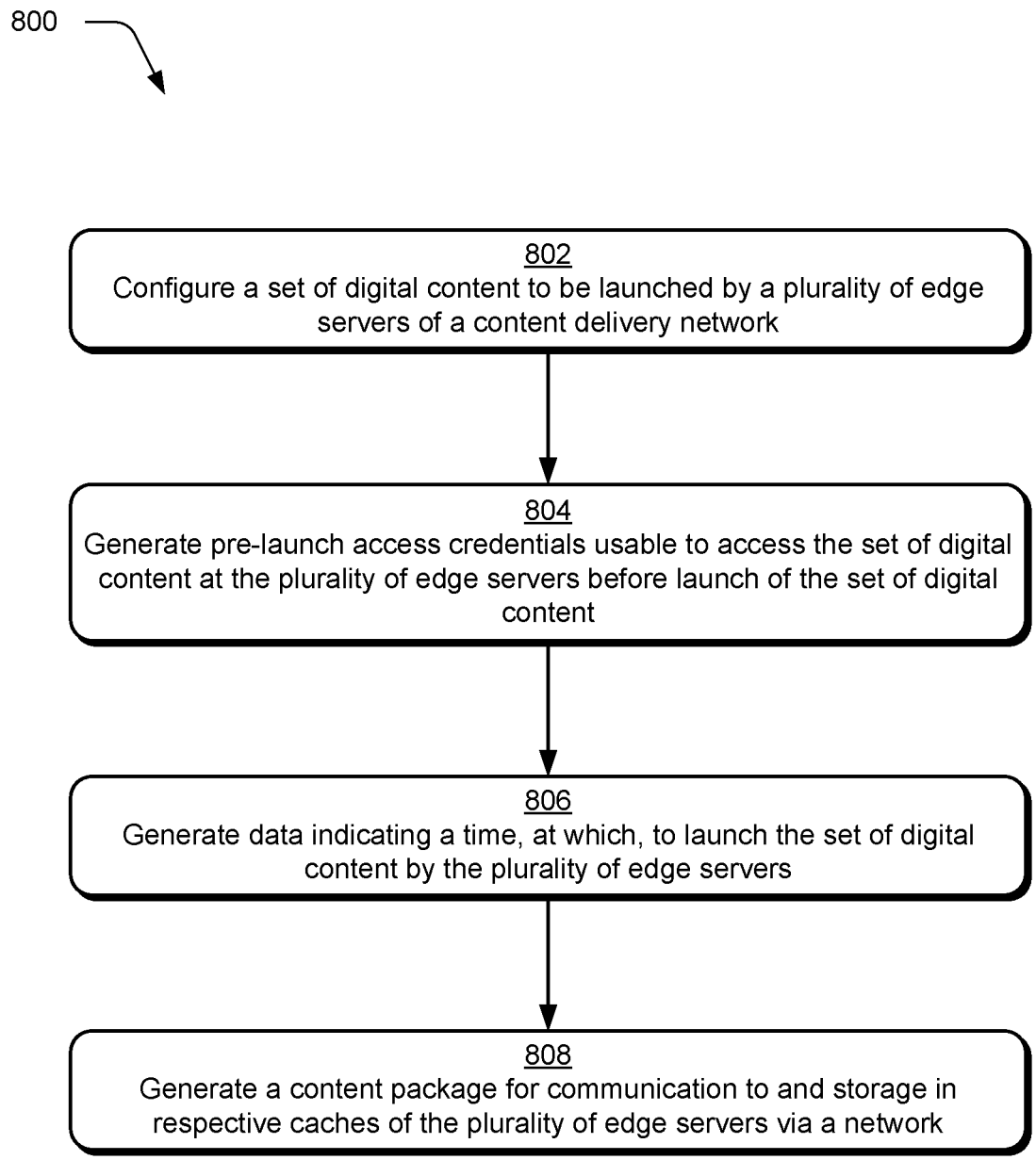
FIG. 8 is a flow diagram depicting a procedure in an example implementation of content package generation at an origin server to cause automated digital content launch at edge servers.

The following discussion describes cache prepopulation techniques that are implementable utilizing the previously described systems and devices. Aspects of each of the procedures are implemented in hardware, firmware, software, or a combination thereof The procedures are shown as a set of blocks that specify operations performed by one or more devices and are not necessarily limited to the orders shown for performing the operations by the respective blocks. In portions of the following discussion, reference will be made to FIGS. 1-6 in parallel with example procedures 700, 800 of FIGS. 7 and 8.

Figure 2:
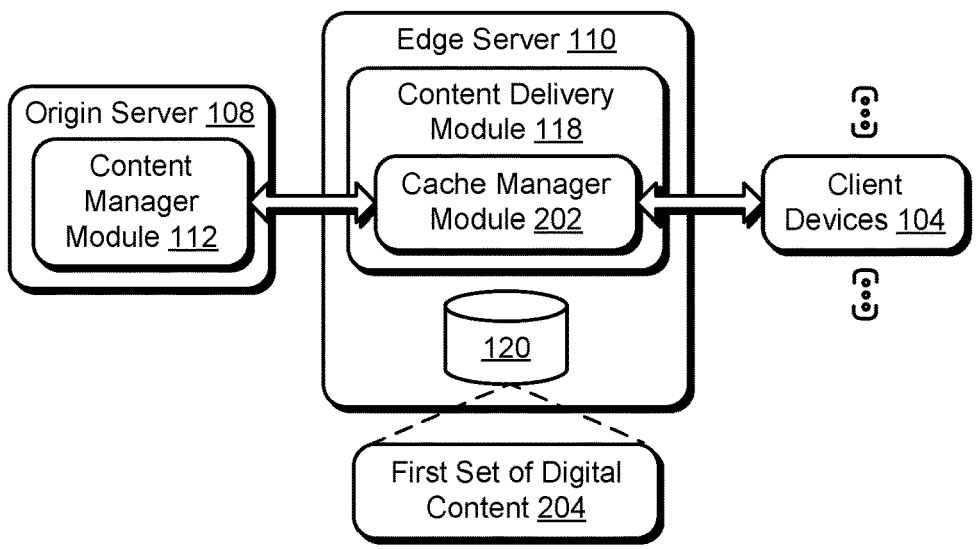
FIG. 2 depicts an example implementation in which an edge server is employed to distribute digital content.

FIG. 2 depicts an example implementation 200 in which an edge server 110 is employed to distribute digital content. The edge server 110, content delivery module 118, and cache 120 of FIG. 2 are representative of any one of the plurality of edge servers 110(1)-110(N), content delivery modules 118(1)-118(N), and caches 120(1)-120(N) of FIG. 1. The content delivery module 118 includes a cache manager module 202 that is representative of functionality to manage which items of a first set of digital content 204 are maintained in the cache 120, respond to content requests to access the items, and so forth.

A content delivery module 118 of the edge server 110 communicates items from a first set of digital content 204 to client devices 104 via a network 106. The communication of these items is performed responsive to content requests received from the client devices 104 (block 702). The cache 120, for instance, includes a first set of digital content 204 that is made available responsive to content requests received from the client devices 104. The first set of digital content 204 is configurable in a variety of ways, such as an initial set of webpages from a website.

In one example, an entirety of the webpages of the website are maintained as the first set of digital content 204 in the cache 120. In another example, the first set of digital content 204 is maintained and managed "on demand" by the cache manager module 202 based on content requests received from the client devices 104 at the respective edge server 110. The cache manager module 202 is configured to maintain webpages from the first set of digital content 204 based on frequency of content requests, how recently requests have been received to access respective items (e.g., webpages) of the first set of digital content 204, and so forth. The cache manager module 202, for instance, obtains items of digital content from the origin server 108 and maintains those items in cache 120 on demand to service subsequent content requests. A variety of other cache management techniques are also contemplated.

Figure 3:
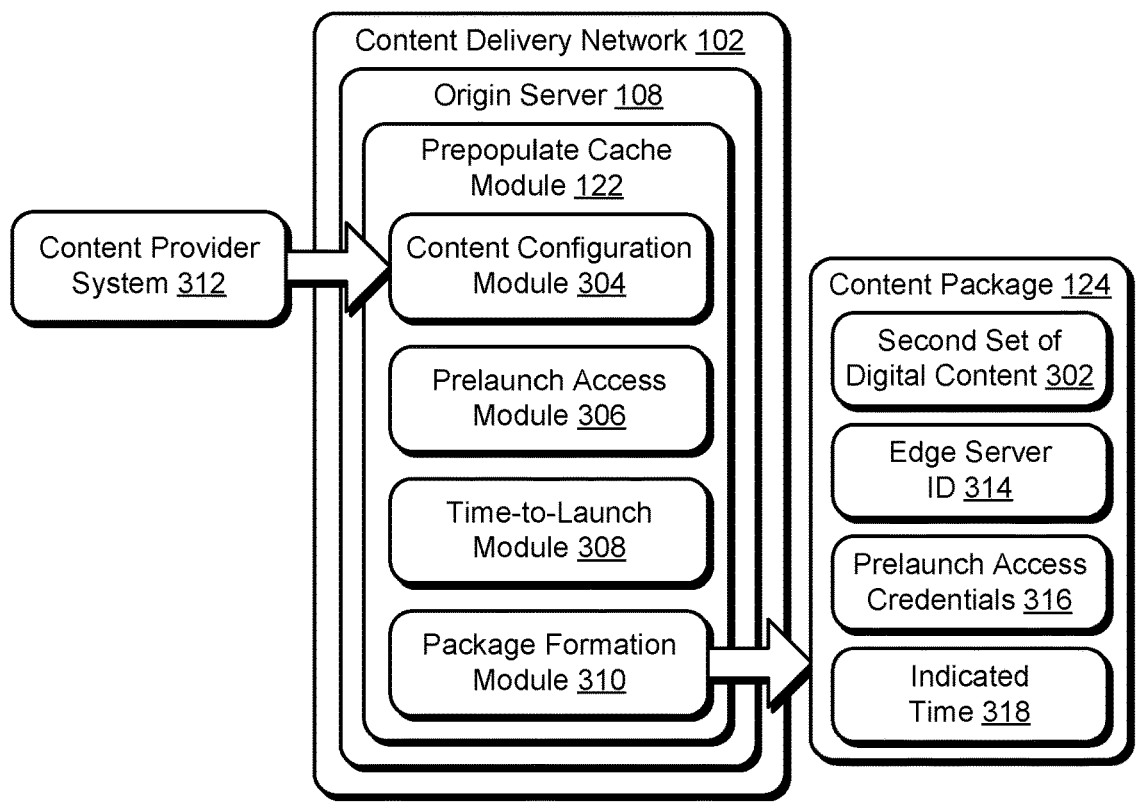
FIG. 3 depicts an example system in which a second set of digital content is configured for launch by an origin server.

FIG. 3 depicts an example system 300 in which a second set of digital content 302 is configured for launch by an origin server 108. While items of the first set of digital content 204 are provided by the edge server 110 in FIG. 2 responsive to content requests received from the client devise 104, the second set of digital content 302 is configured at the origin server 108 for launch by a plurality of edge servers 110 of a content delivery network (block 802).

Examples of functionality to do so by the prepopulate cache module 122 are illustrated as a content configuration module 304, a prelaunch access module 306, a time-to-launch module 308, and a package formation module 310. Other examples are also contemplated, e.g., a content testing module to test the digital content and perform debugging operations at the edge server 110 before deployment.

The second set of digital content 302 is received in this example from a content provider system 312 that is to be launched as a replacement for the first set of digital content 204. The content provider system 312, for instance, originates the second set of digital content 302 as webpages that are available via respective uniform resource locators (URLs) that are to replace webpages of the first set of digital content 204 that are currently available via those URLs.

The prepopulate cache module 122 is configured to generate a content package 124. The content package 124 is configured to cause a respective edge server 110 to launch the second set of digital content 302, automatically and without user intervention, responsive to receipt of the package. The client configuration module 304, for instance, is configured to specify a particular edge server 110 that is to receive the second set of digital content 302. This is usable, for instance, to specify an edge server identifier (ID) 314 specified as part of the content delivery network 102, a network address associated with the edge server 110, and a variety of other techniques.

The prelaunch access module 306 is configured to generate prelaunch access credentials 316. The prelaunch access credentials 316 are usable to control access the second set of digital content 302 at the plurality of edge servers before launch (block 804). The content provider system 312, content delivery network 102, or other entity, for instance, uses the credentials (e.g., key, login, etc.) to access the second set of digital content 302 at respective edge servers. This is usable to verify availability of the second set of digital content 302 at a respective cache 120 before launch, confirm content operation, and so on as further described with respect to FIG. 5.

The time-to-launch module 308 is implemented by the origin server 108 to generate data indicating a time, at which, to launch the set of digital content by the plurality of edge servers (block 806). In an implementation, this time is configured to coordinate the launch of the second set of digital content 302 simultaneously by the plurality of edge servers 110(1)-110(N). The time indication is configurable in a variety of ways, such as through use of a network time protocol (NTP) that is typically utilized by load balancers based on an input received from atomic clocks. An example of which is further described in relation to FIG. 6.

A package formation module 310 is then employed to generate the content package 124 for communication to and storage in respective caches of the plurality of edge servers via a network (block 808). The content package 124 in the illustrated example includes the second set of digital content 302, the edge server ID 314 (e.g., the address to which the package is to be communicated), the prelaunch access credentials 316, and the data having the indicated time 318. The content package 124 is configured to cause the launch of the second set of digital content 302, automatically and without user intervention, by the plurality of edge servers 110(1)-110(N).

Figure 4:
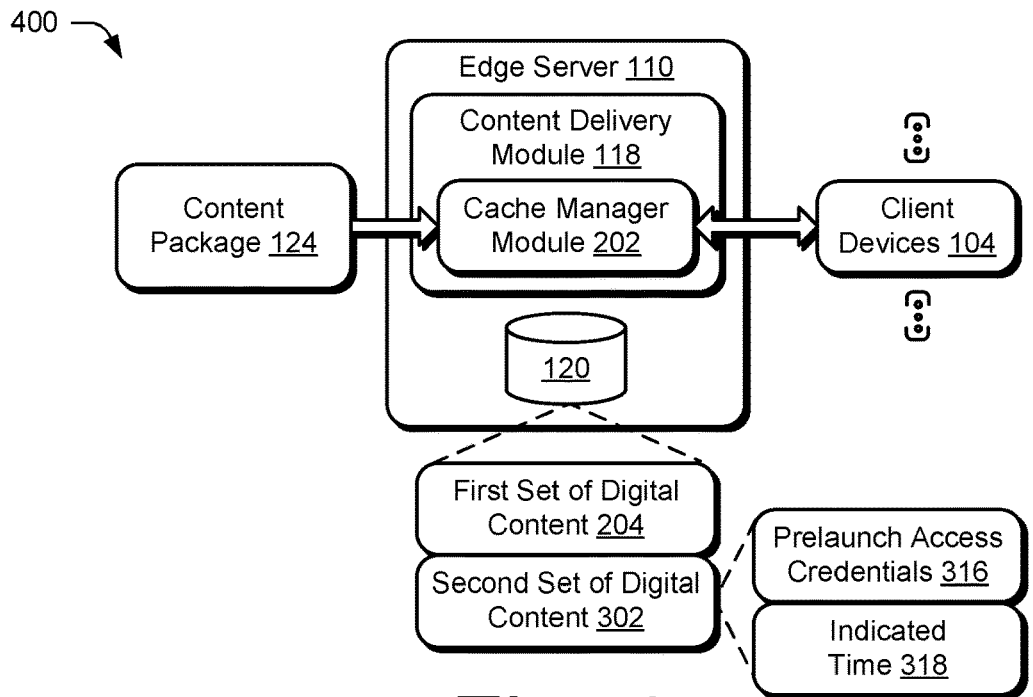
FIG. 4 depicts an example system showing receipt and retention of the content package of FIG. 3 by an edge server.

FIG. 4 depicts an example system 400 showing receipt and retention of the content package 124 of FIG. 3 by an edge server 110. The content package 124 received by the edge server 110 includes the second set of digital content 302 and the indicated time 318, at which, the second set of digital content 302 is to be made available for access at the edge server 110 (block 704). The content package 124 also includes prelaunch access credentials 316.

During receipt of the content package 124, the cache manager module 202 continues to respond to content requests from the client devices 104 using the first set of digital content 204. The second set of digital content 302, on the other hand, is stored in the cache 120 as inaccessible via content requests from the client devices 104 (block 706), e.g., in a separate partition. As a result, the second set of digital content 302 is "pre-warmed" in the cache 120 before launch.

Figure 5:
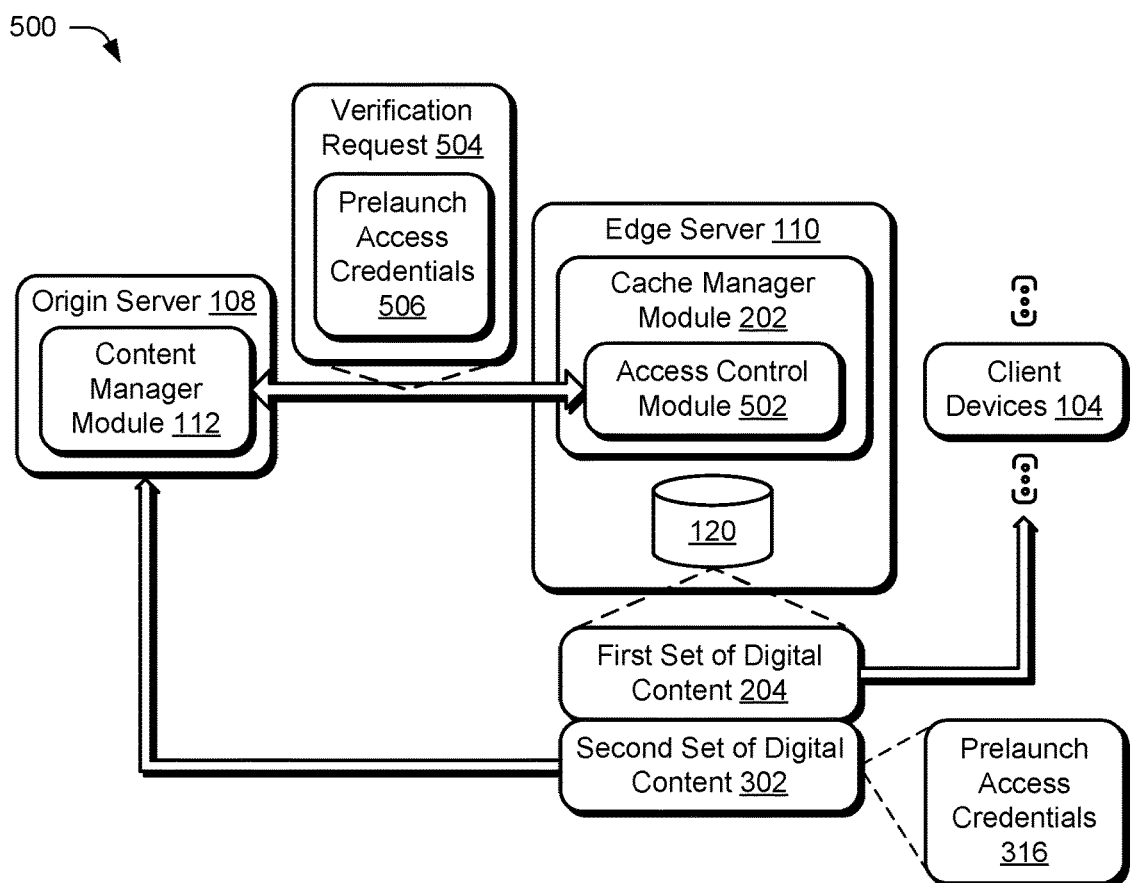
FIG. 5 depicts an example system showing prelaunch access management to the second set of digital content.

FIG. 5 depicts an example system 500 showing prelaunch access management to the second set of digital content 302. An access control module 502 of the cache manager module 202 is utilized to manage access to the second set of content 302 before the indicated time using prelaunch access credentials 316 (block 708).

A verification request 504, for instance, is received from the origin server 108 to verify receipt and storage of the second set of digital content 302. The verification request 504 includes prelaunch access credentials 506 that are compared with the prelaunch access credentials 316 provided as part of the content package 124 and maintained with the second set of digital content 302, e.g., by comparing keys, login credentials, and so forth. Other examples are also contemplated, such as through access of an obfuscated network address (e.g., URL) that is not publicly known. This access is usable to support a variety of functionality, such as to verify operation of the second set of digital content 302 using actual hardware and software resources of the edge server 110 that are to be used to distribute the digital content, correct errors in the digital content, confirm that the second set of digital content 302 has been received, and so forth. As a result, the second set of digital content 302 at this stage is pre-warmed to the cache 120 and ready for launch.

Figure 6:
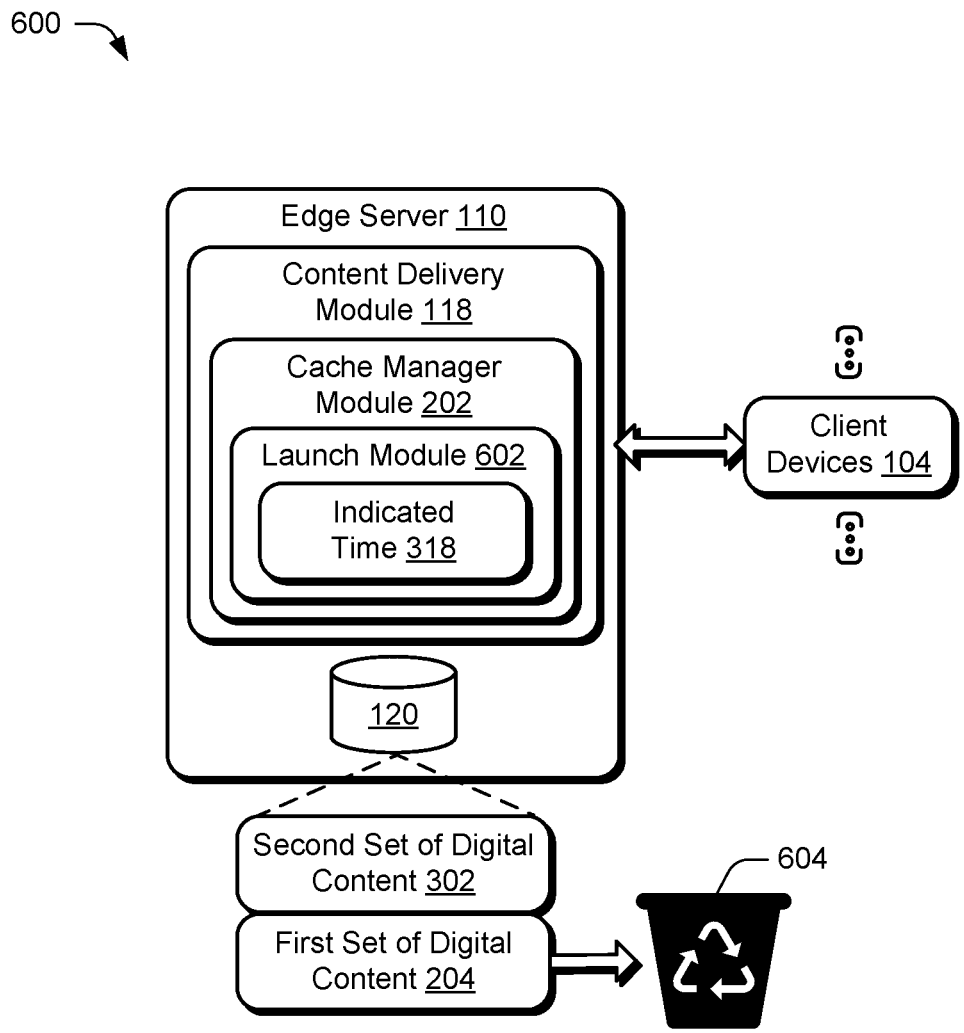
FIG. 6 depicts an example system in which the second set of digital content is launched for access by respective client devices via content requests.

FIG. 6 depicts an example system 600 in which the second set of digital content is launched for access by respective client devices 104 via content requests. The edge server 110 includes a launch module 602 incorporated as part of the cache manager module 202. In this example, the launch module 602 is configured to perform a switch from use of the first set of digital content 204 to serve content requests received from the client devices 104 to use of the "prewarmed" second set of digital content 302.

To do so, the launch module 602 performs this switch, automatically and without user intervention, based on the indicated time 318 included as part of the content package 124. For example, responsive to determining by the edge server 110 that the indicated time 318 has been reached, access to the first set of digital content 204 by the client devices is replaced, automatically and without user intervention, with access to the second set of digital content 302 in the cache 120 (block 710). The launch module 602, for instance, uses a network time protocol (NTP) that is typically utilized by load balancers based on an input received from atomic clocks. Therefore, after the indicated time 318 has been reached based on an input received in accordance with the NTP, the switch is made. In an example, this includes deletion 604 of the first set of digital content 204 from the cache 120 (block 712).

The cache manager module 202 is then configured to maintain the second set of digital content 302 in the cache 120, e.g., consistent with previous techniques used to maintain the first set of digital content 204. The cache manager module 202, for instance, maintains the second set of digital content 302 on demand based on subsequent content requests (block 714) received from the client devices 104. In one example, items of the second set of digital content 302 corresponding to items from the first set of digital content 204 (e.g., webpages corresponding to a same URL and thus content requests "match") are maintained, with other items from the second set of digital content 302 being deleted to conserve an amount of storage space of the cache 120. In other words, the content requests used to access the first set of digital content and the content requests used to access the second set of digital content have same respective uniform resource locators (URLs). In this way, specific items are replaced based on "what is in" the cache 120 from the first set of digital content 204. In another example, an entirety of a website described in a first set of digital content 204 is replaced by an entirely of a website described in the second set of digital content 302. A variety of other examples are also contemplated.

Example System and Device

Figure 9:
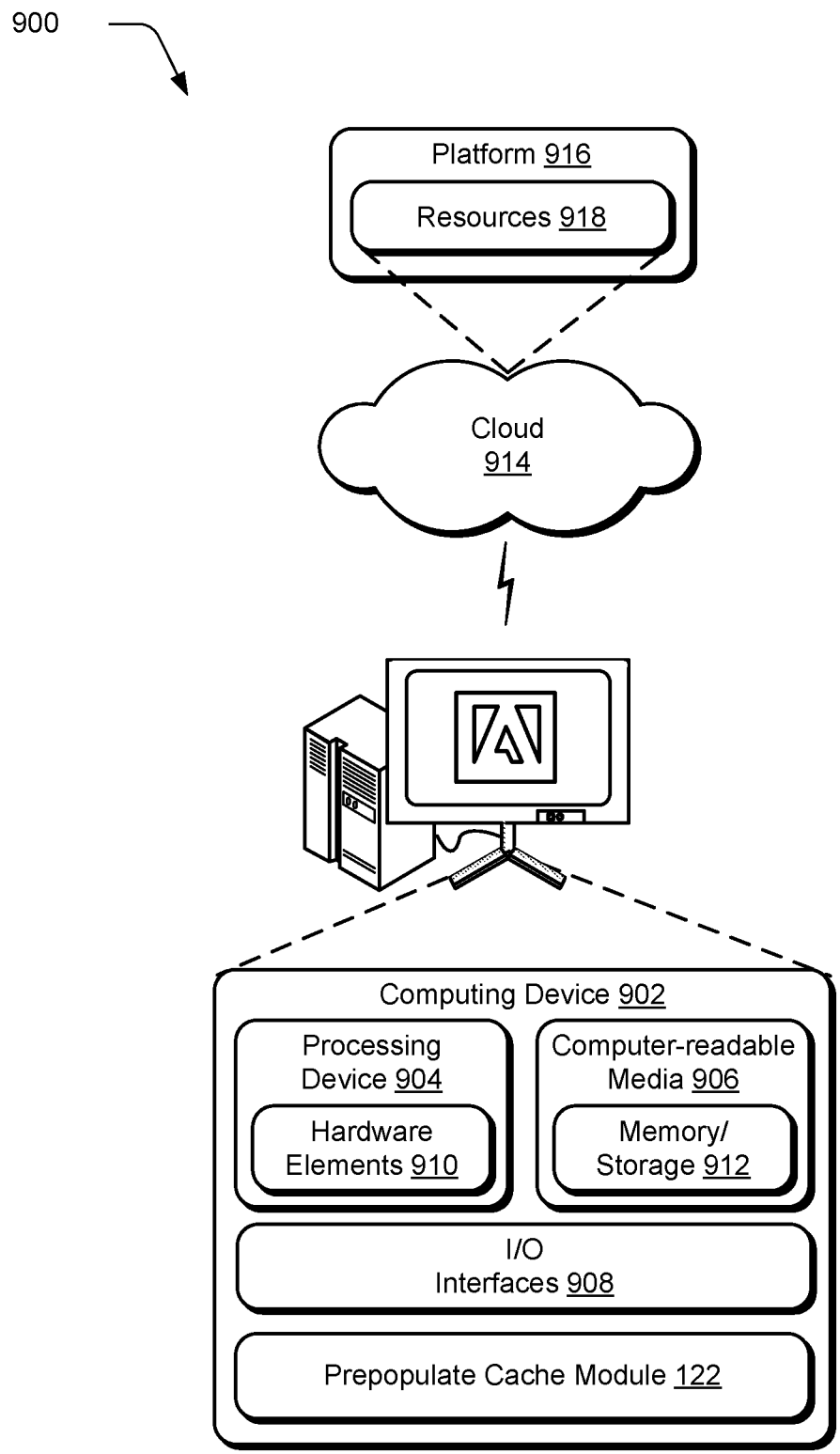
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the prepopulate cache module 122. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

In implementations, the platform 916 employs a "machine-learning model," which refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    communicating, by an edge server, items from a first set of digital content to client devices via a network, the communicating performed responsive to content requests received from the client devices, the first set of digital content maintained in a partition of a cache at the edge server for access by the client devices;
    receiving, by the edge server, a second set of digital content including an indicated time, at which, the second set of digital content is to be made available for access at the edge server;
    storing, by the edge server, the second set of digital content in a separate partition of the cache from the first set of digital content and inaccessible via content requests from the client devices; and
    responsive to determining by the edge server that the indicated time has been reached, replacing access to the first set of digital content by the client devices, automatically and without user intervention, with access to the second set of digital content in the cache.

2. The method as described in claim 1, wherein the replacing includes deleting the first set of digital content from the cache.

3. The method as described in claim 1, wherein the replacing causes the second set of digital content to replace an entirety of the first set of digital content.

4. The method as described in claim 1, wherein the first set of digital content is maintained in the cache on demand as a result of previous content requests received at the edge server.

5. The method as described in claim 4, wherein the previous content requests cause the first set of digital content to be obtained by the edge server from an origin server of a content delivery network that includes the edge server and maintain the first set of digital content in the cache.

6. The method as described in claim 4, further comprising managing the second set of digital content, subsequent to the replacing, in the cache on demand based on subsequent content requests.

7. The method as described in claim 1, wherein the second set of digital content includes prelaunch access credentials usable to control access to the second set of digital content that is otherwise inaccessible via content requests.

8. The method as described in claim 1, wherein the communicating, the receiving, the storing, and the replacing are performed automatically and without user intervention.

9. The method as described in claim 1, wherein the content requests used to access the first set of digital content and the content requests used to access the second set of digital content have same respective uniform resource locators (URLs).

10. The method as described in claim 1, wherein the receiving and the storing of the second set of digital content are performed during the communicating of the items from the first set of digital content to client devices via the network.

11. A system comprising:
    a content configuration module implemented by an origin server to configure a set of digital content to be launched by a plurality of edge servers of a content delivery network;
    a prelaunch access module implemented by the origin server to generate prelaunch access credentials usable to access the set of digital content at a partition of a cache of the plurality of edge servers before launch of the set of digital content;
    a time-to-launch module implemented by the origin server to generate data indicating a time, at which, to launch the set of digital content by the plurality of edge servers; and
    a package formation module implemented by the origin server to generate a content package for communication to and storage in a separate partition of the cache from the set of digital content of the plurality of edge servers via a network, the content package including the set of digital content, the data indicating the time, the prelaunch access credentials and configured to cause the launch of the set of digital content automatically and without user intervention by the plurality of edge servers.

12. The system as described in claim 11, wherein the content configuration module is configured to generate edge server identifiers (IDs) usable to locate the plurality of edge serves via the network.

13. The system as described in claim 11, wherein the set of digital content is configured to replace a previous set of digital content maintained in the respective caches of the plurality of edge servers.

14. The system as described in claim 11, wherein the prelaunch access credentials includes a key usable to control access to the set of digital content that is otherwise inaccessible via content requests before the launch.

15. An edge server comprising:

a processing device; and a computer-readable storage medium implementing a cache and storing instructions that are executable by the processing device to perform operations including:

communicating items from a first set of digital content to client devices via a network, the communicating performed responsive to content requests received from the client devices, the first set of digital content maintained in a partition of the cache for access by the client devices;

storing a second set of digital content in a separate partition of the cache from the first set of digital content and inaccessible via content requests from the client devices; and responsive to determining that an indicated time has been reached, replacing access to the first set of digital content by the client devices, automatically and without user intervention, with access to the second set of digital content in the cache.

16. The edge server as described in claim 15, wherein the replacing includes deleting the first set of digital content from the cache.

17. The edge server as described in claim 15, wherein the first set of digital content is maintained in the cache on demand as a result of previous content requests received at the edge server.

18. The edge server as described in claim 17, wherein the previous content requests cause the first set of digital content to be obtained by the edge server from an origin server of a content delivery network that includes the edge server and maintain the first set of digital content in the cache.

19. The edge server as described in claim 17, the operations further comprising maintaining the second set of digital content, subsequent to the replacing, in the cache on demand based on subsequent content requests.

20. The edge server as described in claim 15, wherein the second set of digital content includes a key usable to control access to the second set of digital content that is otherwise is inaccessible via content requests.

\* \* \* \* \*